United States Patent [19]
Nelson

[11] Patent Number: 5,308,488
[45] Date of Patent: May 3, 1994

[54] DRUM STRUCTURE FOR CORRUGATED TYPE ROTARY FILTERS

[76] Inventor: Philip N. Nelson, P.O. Box 958, West Monroe, La. 71294

[21] Appl. No.: 888,617

[22] Filed: May 27, 1992

[51] Int. Cl.⁵ .................. B01D 33/067; B01D 33/073
[52] U.S. Cl. .................................... 210/404; 210/406
[58] Field of Search ............... 210/402, 403, 404, 406

[56] References Cited

U.S. PATENT DOCUMENTS

| | | | |
|---|---|---|---|
| 3,306,457 | 2/1967 | Putnam | 210/404 |
| 3,306,460 | 2/1967 | Luthi | 210/404 |
| 3,323,654 | 6/1967 | Lee | 210/404 |
| 3,363,774 | 1/1968 | Luthi | 210/404 |
| 3,409,139 | 11/1968 | Jackson | 210/404 |
| 3,680,708 | 8/1972 | Luthi | 210/404 |
| 3,837,499 | 9/1974 | Luthi | 210/404 |
| 4,581,139 | 4/1986 | Kosonen | 210/404 |
| 4,663,040 | 5/1987 | Elizondo et al. | 210/402 |

Primary Examiner—Thomas M. Lithgow
Attorney, Agent, or Firm—Parkhurst, Wendel & Rossi

[57] ABSTRACT

An improved drum structure for a corrugated deck type rotary drum filter is provided that increases filter efficiency by eliminating transverse filtrate flow in the drain channels of the drum. Each drain channel is divided into sub-channels using at least one solid grid. The sub-channels drain into a single bucket associated with the drain channel. A drain slit is provided above each sub-channel in the corrugated material that covers the outer surface of the drum.

2 Claims, 3 Drawing Sheets

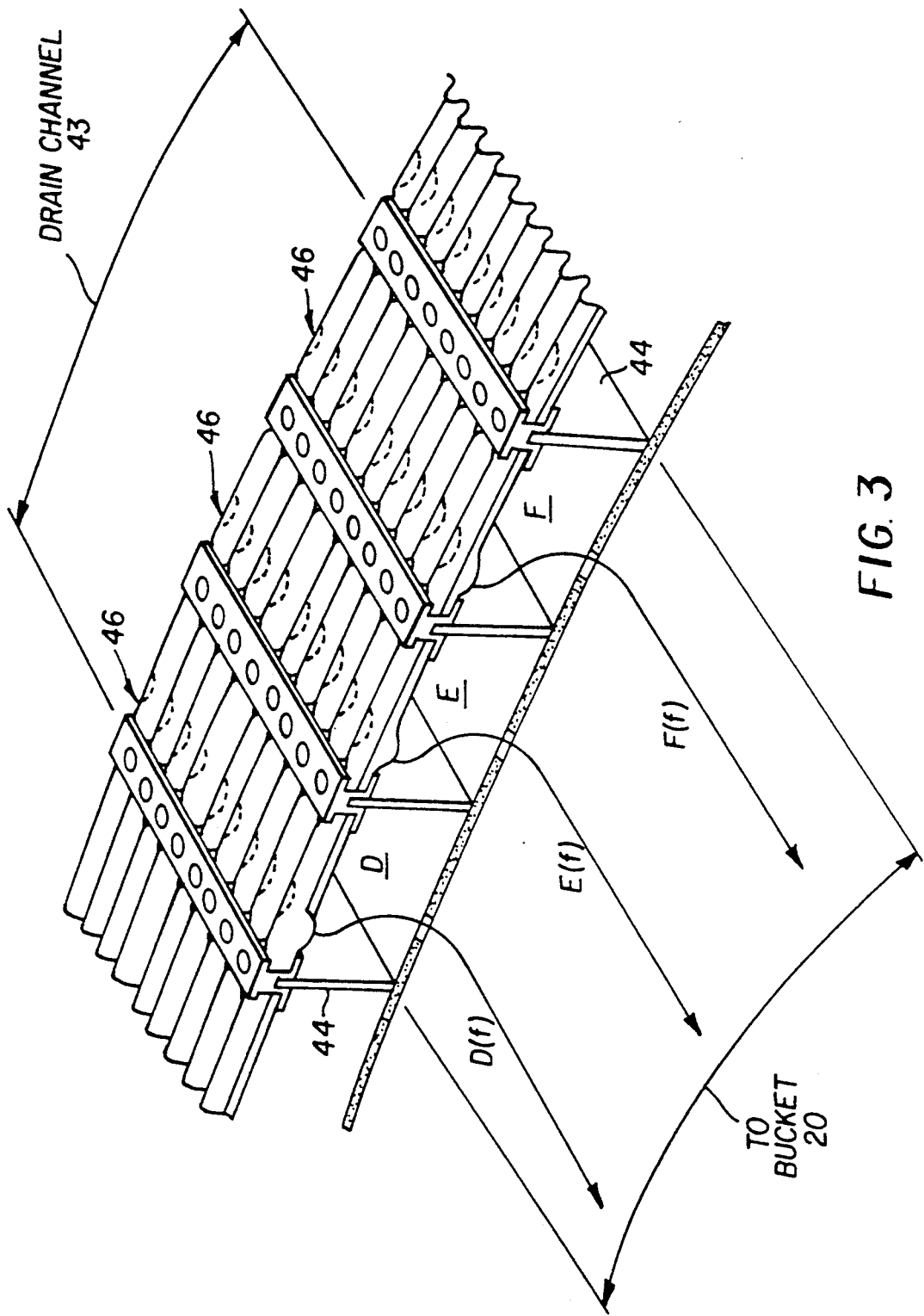

DRUM STRUCTURE FOR CORRUGATED TYPE ROTARY FILTERS

BACKGROUND OF THE INVENTION

The invention relates in general to rotary drum filters. More specifically, the invention relates to an improved deck design that increases filter efficiency for corrugated deck type rotary drum filters.

Rotary drum filters are used in the pulp and paper industry to filter liquid out of pulp. The filters include a cylindrically shaped drum that is typically constructed of metallic and/or fiberglass materials. In operation, the drum is partially submerged in a vat containing a paper pulp stock. The outer surface of the drum acts a filtering medium or structure that passes liquid as the drum is rotated. Pulp is retained on, and subsequently removed from, the outer surface of the drum.

The drum includes a cylindrical shell that is supported on the inside by flyrings and is closed at each end by end supports. Longitudinal grids are installed perpendicular to the outside surface or deck of the shell in a predetermined spaced relationship. The longitudinal divider grids or rib elements extend along the entire length of the deck and define drain channels that empty into vacuum shut off sections, referred to as buckets, located at the periphery of the deck.

In some filters, referred to as "open channel filters", the longitudinal grids are covered with a backing wire that forms the outer surface of the drum. Liquid can pass through the spaces provided between the backing wire while pulp is retained on the surface of the wire. In other filters, referred to as "corrugated deck filters", an example of which is disclosed in U.S. Pat. No. 3,837,499, the contents of which is herein incorporated by reference, the longitudinal grids are covered with a corrugated material that forms the outer surface of the drum. The corrugated material includes drain slits that correspond to the drain channels. Each drain slit permits liquid to pass through the corrugated material to a single drain channel while pulp is retained on the surface of the corrugated material. It is an object of the present invention to increase the filtering efficiency of corrugated deck type rotary filters.

SUMMARY OF THE INVENTION

The invention provides a corrugated deck type rotary drum filter having a drum structure that increases filter efficiency. The increase in filter efficiency is accomplished by eliminating transverse filtrate flow in each of the drain channels of the drum, by dividing each individual drain channel into multiple sub-channels and providing a separate drain slot above each sub-channel in the corrugated material that comprises the outer surface of the drum. The improved drum structure of the present invention improves the filter washing efficiency by providing conservation of energy as compared with conventional transverse filtrate flow designs.

In particular, a drum structure for a rotary drum filter is provided that includes a cylindrical shell; a plurality of longitudinal dividing grids located on an outer surface of a cylindrical shell, wherein each pair of adjacent longitudinal dividing grids define a drain channel; at least one longitudinal solid grid located in the drain channel, wherein the longitudinal solid grid forms multiple sub-channels within the drain channel; an outer surface comprising a corrugated material spaced from the outer surface of the cylindrical shell by the longitudinal dividing grids, wherein the corrugated material has a drainage slot located above each sub-channel; and a bucket coupled to the multiple sub-channels.

BRIEF DESCRIPTION OF THE DRAWINGS

With the above as background, reference should be made to the following description of the best modes of carrying out the invention and the accompanying drawings, wherein:

FIG. 3 illustrates a detailed view of area A located in FIG. 1, wherein an improved deck structure in accordance with the present invention is provided.

BEST MODES OF CARRYING OUT THE INVENTION

Figure 1:
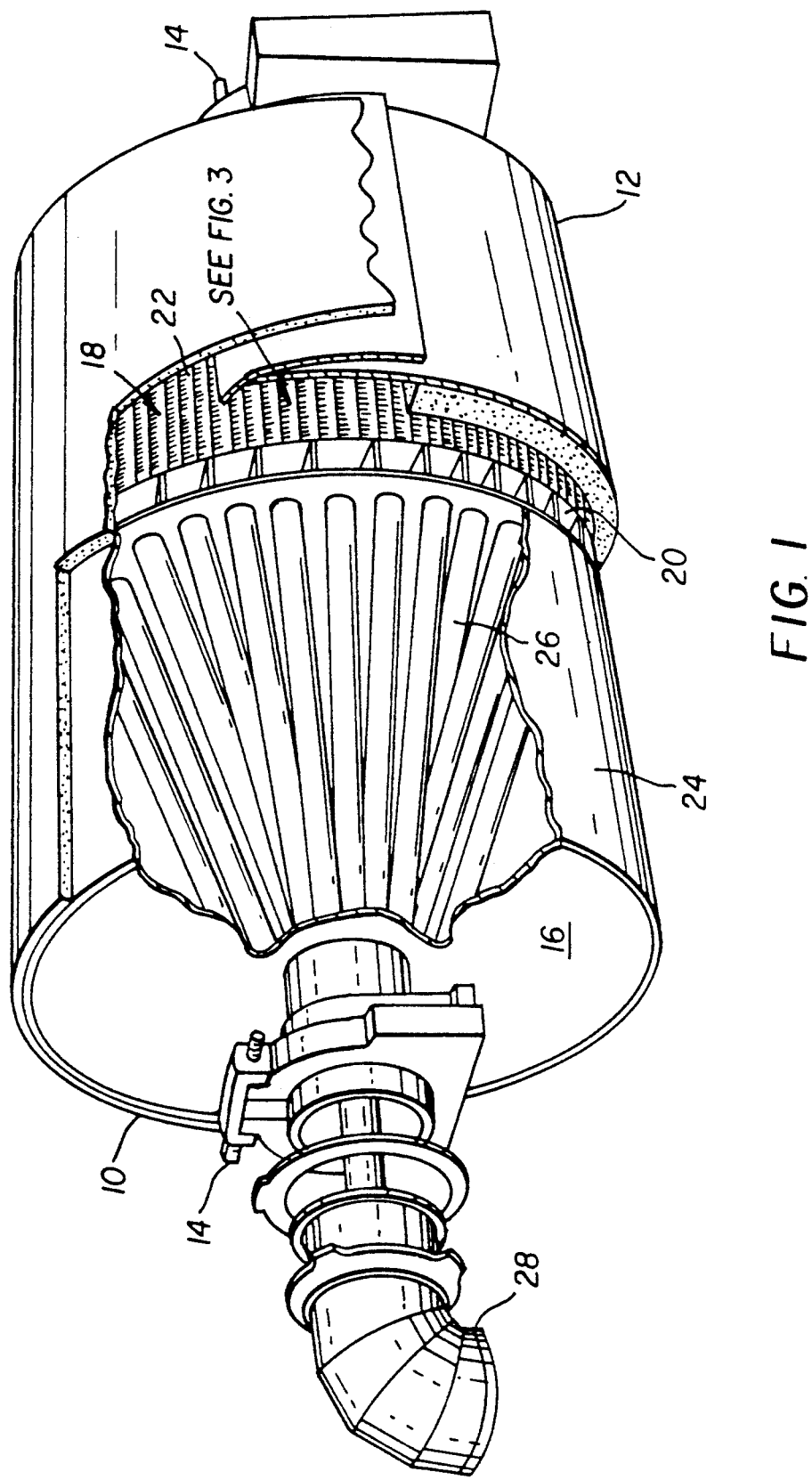
FIG. 1 illustrates a partial cutaway view of a rotary drum filter.

Referring now to FIG. 1, a rotary drum filter is shown that includes a drum 10 that is normally suspended in a vat 12 by a trunnion drive coupling 14. The drum 10 includes two co-axial drum halves 16, 18 connected together by a vacuum section containing a plurality of buckets 20. The outer surface of each drum half 16, 18 is constructed of a corrugated material 22 that is supported over the outer surface or deck of a cylindrical shell 24 by longitudinal grids or ribs (not shown). The right drum half 18 illustrated is shown in FIG. 1 with the corrugated material 22 in place, while the left drum half 16 is shown without the corrugated material 22 to illustrate the underlying cylindrical shell 24. The longitudinal grids form a plurality of drain channels and each drain channel empties into one of the buckets 20 located at the center of the drum 10. Each of the buckets 20 is connected to a drain pipe 26 that passes through an opening in the trunnion drive coupling 14 and into a drop leg 28.

The filter illustrated in FIG. 1 is generally referred to as a "pipe type" rotary drum filter. It will be understood, however, that the invention is not limited to this particularly type of rotary filter, but is applicable to all types of rotary drum filters, including center valve and internal drain rotary filters, that utilize a corrugated deck structure.

Figure 2:
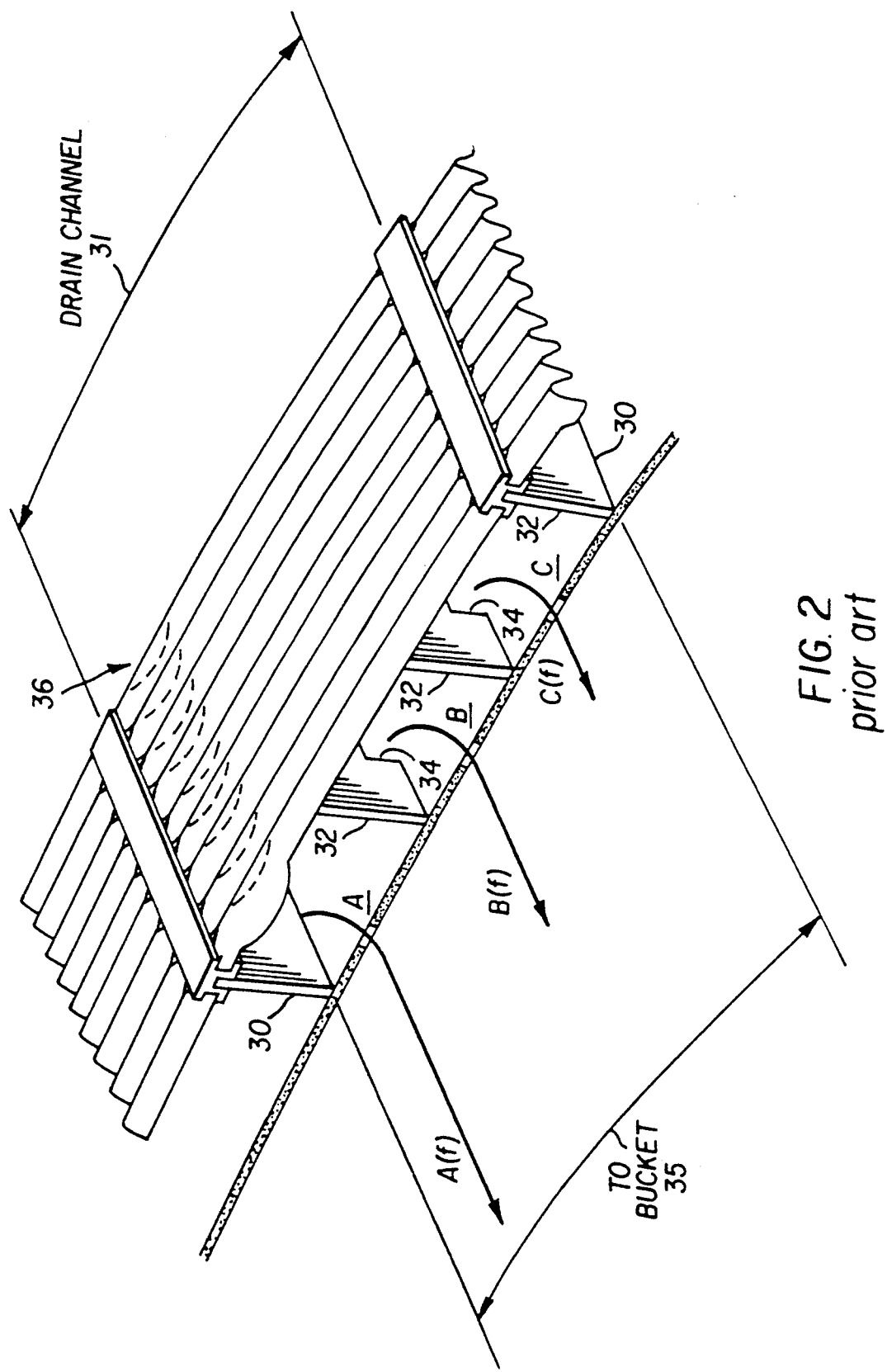
FIG. 2 illustrates a section of a conventional deck structure in a corrugated type rotary drum filter.

FIG. 2 illustrates a portion of a conventional corrugated deck type rotary drum filter. In the conventional drum structure, intermediate grids 32 are provided between two adjacent longitudinal divider grids 30 in order to divide the drain channel 31 defined by the adjacent longitudinal divider grids 30 into compartments A, B, C. The intermediate grids 32 have openings 34 that permit filtrate entering into compartment A via the drainage slit 36 to pass transversely between the intermediate grids 34 and into compartments B and C. The filtrate subsequently drains transversely and longitudinally into the bucket 35 associated with the drain channel 31 from the compartments A, B and C as is illustrated by the filtrate flow lines A(f), B(f) and C(f).

As is clearly illustrated in FIG. 2, the most direct path from the drainage slit 36 to the bucket 35 for the filtrate is the path through compartment A, and the least direct path for the filtrate is the path through compartment C. The transverse movement required for the filtrate to pass through the openings 34 of the intermediate grids 32 has been found to reduce the filtering efficiency of the rotary drum filters. The invention improves filtering efficiency by eliminating the requirement for transverse movement of the filtrate.

A detailed view of Section A of the rotary drum 10 illustrated in FIG. 1 that incorporates the invention is shown in FIG. 3. In the illustrated embodiment, the intermediate grids 34 of the conventional rotary drum filter are replaced with solid grids 42 that divide a drain channel 43 defined by adjacent longitudinal dividing grids 44 into self-contained multiple sub-channels D, E and F. A separate drainage slit 46 is provided in the corrugated material 22 that covers the solid grids 42 and divider grids 44 above each sub-channel D, E and F. Filtrate passes directly through the drainage slits 46 and into their corresponding sub-channels D, E and F, and subsequently drains into a single bucket 20 corresponding to the sub-channels D, E and F as illustrated by filtrate flow lines D(f), E(f) and F(f).

In contrast to conventional structures, transverse filtrate flow between sub-channels is prevented by the solid grids 42. All filtrate flow is substantially longitudinal and direct into the bucket 20. Comparing FIGS. 2 and 3, the flow of filtrate along line A(f) is equivalent to the flow of filtrate along line D(f), but the flow of filtrate along lines B(f) and C(f) meet transverse resistance as compared with the flow of filtrate along lines E(f) and F(f). The multiple sub-channels of the present invention therefore improve the drainage rate over conventional corrugated deck type rotary filter designs.

The invention has been described with reference to certain preferred embodiments thereof. It will be understood, however, that modifications and variations are possible within the scope of the appended claims. For example, although the illustrated embodiment shows three sub-channels per drain channel, the number of sub-channels can be readily varied from a minimum of two to any desired number.

What is claimed is:

1. A drum structure for a rotary drum filter comprising: a cylindrical shell; a plurality of longitudinal bucket dividing grids located on an outer surface of a cylindrical shell, wherein each pair of adjacent longitudinal bucket dividing grids define a drain channel; at least one longitudinal solid grid located in the drain channel, wherein the longitudinal solid grid forms multiple sub-channels within the drain channel and prevents filtrate flow between the sub-channels; an outer surface comprising a corrugated material spaced from the outer surface of the cylindrical shell by the longitudinal bucket dividing grids, wherein the corrugated material has a drainage slot located above each sub-channel; and a single bucket coupled to the multiple sub-channels.

2. A drum structure for a rotary filter as claimed in claim 1, wherein the longitudinal solid grid extends from the outer surface of the cylindrical shell to the corrugated material to form the sub-channels.

* * * * *